Nov. 12, 1935.

H. C. GRAVES, JR., ET AL

Re. 19,753

AUTOMATIC CIRCUIT BREAKER

Original Filed Feb. 15, 1934 2 Sheets-Sheet 1

INVENTORS
Herbert C. Graves Jr.
BY and Otto Jensen
Cornelius L. Echert
their ATTORNEY.

Nov. 12, 1935. H. C. GRAVES, JR., ET AL Re. 19,753

AUTOMATIC CIRCUIT BREAKER

Original Filed Feb. 15, 1934 2 Sheets-Sheet 2

INVENTORS
Herbert C. Graves Jr
and Otto Jensen
BY
Cornelius D. Ethet
their ATTORNEY.

Reissued Nov. 12, 1935 Re. 19,753

UNITED STATES PATENT OFFICE 19,753

AUTOMATIC CIRCUIT BREAKER

Herbert C. Graves, Jr., East Bradford Township, Chester County, and Otto Jensen, Glenside, Pa., assignors to I-T-E Circuit Breaker Company, Philadelphia, Pa., a corporation of New Jersey Original No. 1,999,410, dated April 30, 1935, Serial No. 711,332, February 15, 1934. Application for reissue September 20, 1935, Serial No. 41,458

13 Claims. (Cl. 200—89)

Our invention relates to automatic electric circuit breakers or circuit interrupters and more particularly to new, improved and simplified operating mechanisms therefor.

Heretofore there have been devised numerous complicated operating mechanisms for electric circuit interrupters, most of which have fallen short of giving them any or all of the following well-recognized desirable characteristics. For example, it is desired that a circuit interrupter shall have a high contact pressure and, at the same time, shall be operable by a relatively small closing force. It is also desirable that a circuit interrupter may be latched in its closed position, thus relieving the usual electromagnetic holding coil of continuous duty and, at the same time, it is desirable that the operating mechanism shall be completely non-closable or trip-free; that is, that the movable contact may be operated instantly to circuit-opening position under abnormal circuit conditions without hindrance from the closing mechanism. It is also desirable that the latching mechanism shall automatically reset and that the breaker may be reclosed after a circuit-opening operation by a single movement of the circuit-closing mechanism.

It is an object of our invention, therefore, to provide a new and improved electric circuit interrupter and more particularly a new and improved operating mechanism therefor which will embody one or more of the above-mentioned desirable characteristics and which will be simple, reliable in operation, and economical to manufacture.

It is another object of our invention to provide a new and improved operating mechanism for an electric circuit interrupter in which a high contact pressure may be secured by the use of a relatively small operating force, and in which the interrupter may be tripped to open-circuit position by a minimum tripping force.

It is a further object of our invention to provide a new and improved operating mechanism for an electric circuit interrupter in which the movable contact is latched in its closed position and is entirely non-closable or trip-free of the closing mechanism.

It is a further object of our invention to provide a new and improved operating mechanism for an electric circuit interrupter in which there is provided a latch mechanism for normally maintaining the interrupter in circuit-closing position and in which the latching mechanism will automatically reset after a tripping operation.

It is a still further object of our invention to provide a new and improved operating mechanism for an electric circuit interrupter in which the closing operation of the interrupter may be effected, after a tripping operation, by a single movement of the operating mechanism.

For a better understanding of our invention, together with other and further objects thereof, reference is had to the following description taken in connection with the accompanying drawings, and its scope will be pointed out in the appended claims.

Figure 2:
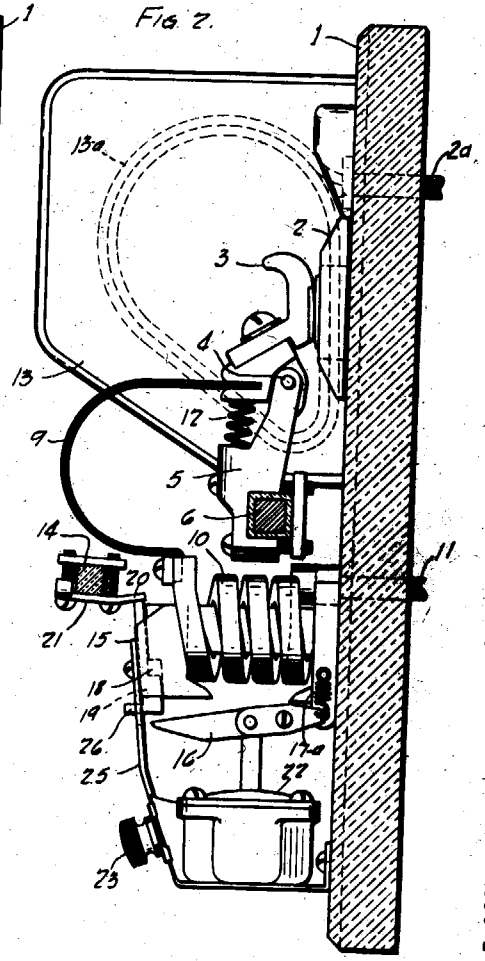
Figure 1:
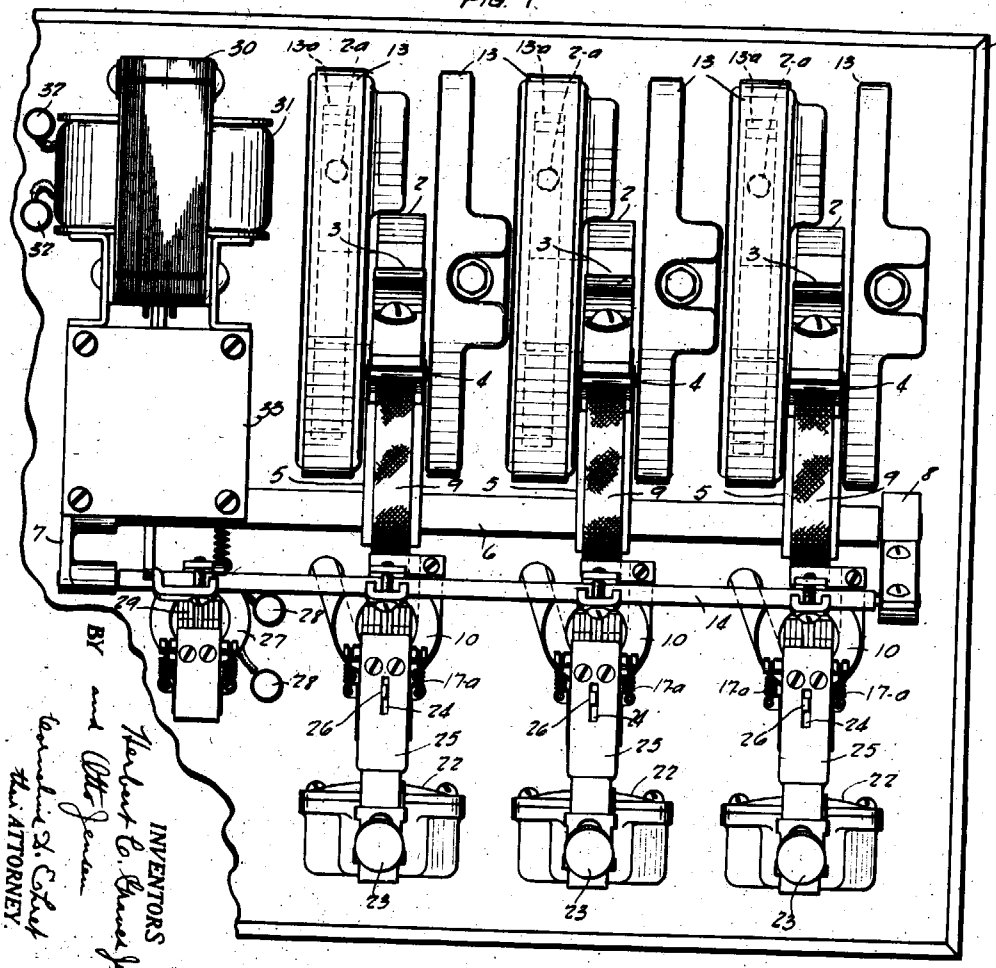
Figure 8:
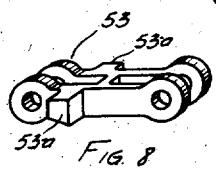

In the drawings, Fig. 1 represents a front elevation of our improved electric circuit interrupter embodying our new and improved operating mechanism; Fig. 2 is a cross-sectional view of the assembly shown in Fig. 1; Figs. 3, 4, 5 and 6 shows details of the operating mechanism in the several phases of a cycle of operation; and Figs. 7 and 8 illustrate, in detailed perspective, certain links employed in the operating mechanism of Figs. 3–6, inclusive.

Referring now more particularly to Figs. 1 and 2 of the drawings, there is illustrated a 3-pole electric circuit interrupter comprising a panel or base member 1 upon which are mounted the several stationary contacts 2. Cooperating with each of the several stationary contacts 2 is a movable contact 3 mounted on a pivot 4 located in the end of a supporting arm 5 which is clamped upon an insulated shaft 6 journalled at each end in the brackets 7 and 8. The electric circuit of each pair of cooperating contacts 2, 3 is completed through a flexible conductor 9 and a series-connected over-current coil 10, the other terminal of which is similarly connected to a stud 11 or other suitable connector structure emerging at the back of the panel, as illustrated. A wiping spring 12 is preferably interposed between each supporting arm 5 and its associated movable contact 3 to ensure an adequate contact pressure at all times. Suitable baffles or barriers 13 may be mounted on the panel at both sides of each pair of cooperating contacts 2 and 3 to restrict or confine the arc, upon the operation of the interrupter to circuit-opening position, in a well-known manner. If desired, magnetic blowout coils 13a may be included in one of the baffles adjacent each pair of cooperating contacts 2—3 and may be connected between the stationary contacts 2 and cooperating studs or connector structures 2a emerging at the back of the panel.

In order to trip the latching mechanism, which is effective normally to latch the cooperating contacts 2, 3 into circuit-closed position, as described more fully hereinafter, there is provided a tripping shaft 14 also journalled at its end in the brackets 7 and 8 mounted on the panel 1. This tripping shaft may be actuated selectively in response to abnormal circuit conditions in any of the circuits including the cooperating pairs of contacts 2 and 3. For this purpose there is associated with each of the series-connected trip coils 10 a magnetic core structure 15 provided with a pivotally mounted magnetic armature 16 suitably biased by its own weight, as illustrated, or by an auxiliary biasing spring, or by both, if desired, to a position effecting a gap in the magnetic circuit of its associated coil 10. The auxiliary springs 17a are for the purpose of eliminating rattling of the armature at its hinges. There is also provided a slot 18 in the outer pole member of each of the magnetic cores 15 in which is mounted a trip rod 19, the lower end of which is in the path of movement of the pivoted armature 16 when moving, in response to abnormal energization of its coil 10, to close the gap in the magnetic circuit of the core 15. The upper end of the trip rod 19 engages a projection 20 of a clamp mechanism 21 attached to the tripping shaft 14.

Any suitable time-delay mechanism, such as a dash-pot 22, is preferably provided for the tripping mechanism associated with the circuit of each cooperating pair of contacts 2 and 3. The tripping mechanism, just described, may be adjusted to operate in response to different magnitudes of overload current by means of an adjusting screw 23 on the time-delay mechanism 22 which is effective to vary the lower position of the pivoted armature 16, and thus the value of current flowing in the coil 10 which is adequate to lift the armature 16 against the force of gravity. A guide slot 24 in a strip 25 secured to the dash-pot 22 engages a projection 26 on the trip-rod 19 and limits the lower position of this trip-rod to such a point that the armature falls substantially below its lower end, as shown in Fig. 2, so that the armature 16 has a striking action as it is attracted by the core member 15 to close the gap in the magnetic circuit.

In case it is desirable to trip the circuit interrupter at will or in response to any other predetermined operation or condition, and independently of the overload tripping apparatus described above, there may be provided an additional tripping coil 27 connected to a pair of terminals 28 and provided with a magnetic core member 29 with which cooperates a movable armature and trip-rod engaging a tripping arm 20 mounted on the shaft 14 in a manner similar to that of the above-described tripping mechanisms. It will be understood that the terminals 28 may be connected to any suitable circuit in response to the energization of which it is desired that the circuit interrupter shall be tripped.

Figure 3:
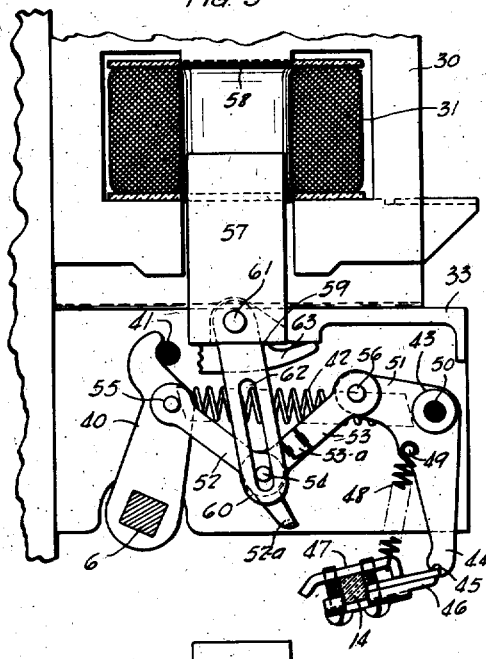

Our improved circuit interrupter may be operated to circuit-closing position either manually or electromagnetically, although we have illustrated an electromagnet comprising a stationary magnetic core member 30 and a coil 31, connected to terminals 32, as one means of effecting this operation. The operating, latching, and tripping mechanisms are enclosed within the housing 33, a portion of which may be integral with the bracket 7. These latter mechanisms are shown in more detail in Figs. 3, 4, 5 and 6. Referring more particularly to Fig. 3, in which the operating mechanism is shown in the position corresponding to circuit-opening position of the circuit interrupter, the electromagnet 30—31 being deenergized, there is shown an operating crank 40 engaging the operating shaft 6 of the several movable contacts 3 and normally biased against a stop 41 by any suitable biasing means, such as a spring 42, one end of which is connected to the arm 40, as at the pin 55, and the other terminal of which may be attached to any stationary portion of the operating mechanism or its housing. There is also provided a latching mechanism comprising a bell-crank 43 having an arm 44, in the outer end of which is a detent 45 engaging a latching member 46 clamped to the tripping shaft 14 by any suitable clamping mechanism 47. A biasing spring 48 interconnects the latching member 46, or some portion of its clamping mechanism, and a pin 49 disposed on the bell-crank 43, and serves to secure the engagement of the detent 45 and the latch member 46.

The bell-crank 43 is supported in the housing 33 by a pivot 50, which forms a suitable support for the stationary terminal of the biasing spring 42. Interconnecting the other arm 51 of the bell-crank 43 and the operating crank 40 of the circuit-interrupting mechanism is a force multiplying, or linkage, mechanism, such as a toggle mechanism, comprising a pair of links 52 and a link 53, shown more clearly in Figs. 7 and 8, hinged together by a pivot pin 54 and connected to the arm 40 by a pivot pin 55 and to the arm 51 of the crank 43 by a pivot pin 56. The links 52 are provided with extensions 52a which cooperate with stops 53a on the link 53 to limit the upward movement of the hinge of the toggle mechanism. The electromagnet 30, 31 is provided with a movable armature 57, reciprocable between an upper stop 58 and a lower stop 59. A link 60 is supported in a recess in the lower end of the armature 57 by a pivot 61 and this link is provided with a lost-motion slot 62 engaging the hinge pin 54 of the toggle mechanism 52, 53. Mounted in the housing, also, is a stop or cam member 63, which is mounted in the path of the hinge or any other suitable portion of the toggle mechanism 52, 53, when moving to circuit-opening position, for a purpose to be described more fully hereinafter.

Figure 4:
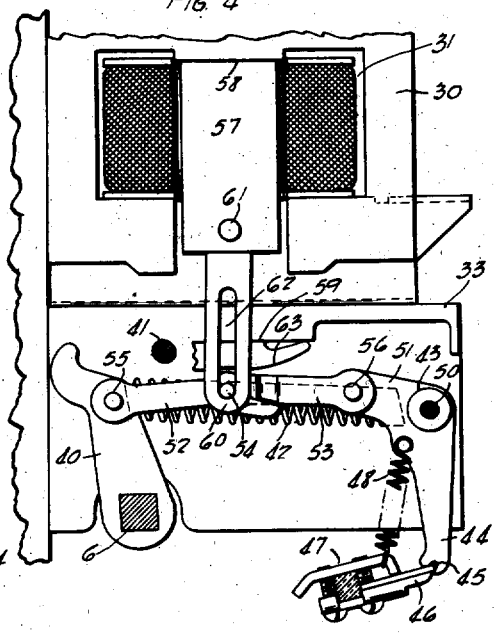
Figure 5:
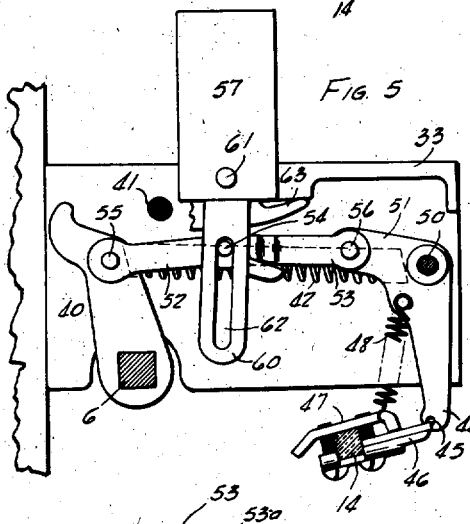
Figure 6:
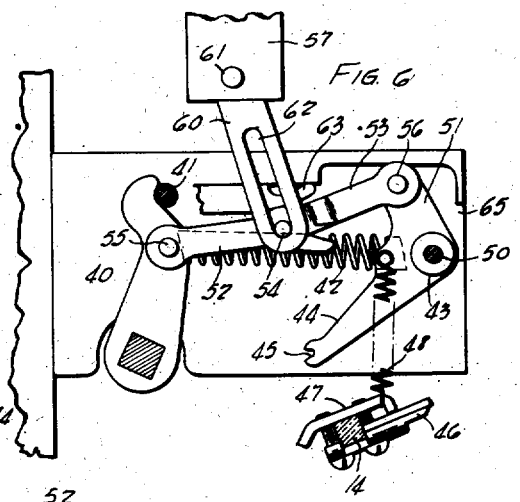
Figure 7:
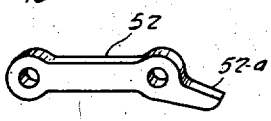

The operation of the above-described operating, latching and tripping mechanism may be understood by following the movements of the several elements in a cycle of operation from circuit-opening position, with deenergized electromagnet, as illustrated in Fig. 3; to circuit-closing position with electromagnet energized, as shown in Fig. 4; to latched-in circuit-closed position with electromagnet deenergized, as represented in Fig. 5; and, finally, to circuit-opening position by operation of the tripping mechanism with the electromagnet energized, as illustrated in Fig. 6.

The changes in the positions of the elements of the operating mechanism when moving from the position represented by Fig. 3 to that represented by Fig. 4, in response to the energization of electromagnet 30, 31, will be well understood by those skilled in the art. As the electromagnet 30, 31 attracts the armature 57 into its upper position illustrated in Fig. 4, the lower end of the lost-motion slot 62 engages the hinge pin 54 of the toggle mechanism 52, 53, separating the pivots 55 and 56 with a force multiplying action and rotating the operating crank 40 and its attached shaft 6 in a counter-clockwise direction, as shown in Figs. 3 and 4, to bring the movable contacts 3 into engagement with the stationary contacts 2, as shown in Fig. 2. The link 60 raises the hinge pin of the toggle mechanism 52—53 slightly across dead center, when the spring 42 and the momentum of the moving parts are effective to tend to collapse the toggle in an upward direction, this collapse being prevented by the stop members 52a—53a, which retain the toggle mechanism in an over-center position. It is thus seen that the circuit interrupter is latched in a circuit-closing position and the electromagnet 30, 31 may be deenergized, allowing its armature 57 to fall, as shown in Fig. 5. The hinge pin 54 moves in the lost-motion slot 62 of the link 60 so that the fall of the armature 57 has no effect upon the positions of the other elements of the operating and latching mechanism. It will be noted that, during this closing operation of the breaker, the latch member 46 remains stationary, so that its operation is independent of the operation of the closing mechanism.

In case an abnormally large current should flow in the circuit of any of the cooperating pairs of contacts 2, 3, for an interval of time determined by the setting of the time-delay mechanism 22, or in case the operating coil 27 should be energized to trip the circuit interrupter in response to any predetermined condition, one of the several trip rods 19 will strike its cooperating tripping arm 20 attached to the trip shaft 14 and will rotate it in a counter-clockwise direction, as referred to Fig. 2, or in a clockwise direction, as referred to Figs. 3, 4, 5 and 6.

Referring more particularly to Fig. 5, as the trip shaft 14 is rotated in a clockwise direction, the latch member 46 disengages the detent 45 in the outer end of the arm 44 and the force of the biasing spring 42 rotates the crank arm 40 and the bell-crank 43 in a clockwise direction, each about its respective axis, to the position shown in Fig. 6. Under these conditions, it will be noted that the crank arm 40 again engages its stop 41 and has moved the contacts 3, attached to the operating shaft 6, to circuit-opening position. During this movement between the positions illustrated in Figs. 5 and 6, the hinge of the toggle mechanism 52, 53, or any other suitable engaging surface thereof, strikes and slides along the cam surface 64 of the stop member 63, which is such as to move the hinge from its over-center position to one in which it may be collapsed downwardly. While in Fig. 6 the armature 57 is illustrated in the position corresponding to the energization of the electromagnet 30, 31, so that the toggle 52, 53 is restrained from completely collapsing, the movement of the several elements of the operating mechanism would be substantially the same if the electromagnet 30, 31 were deenergized, corresponding to the position of the armature 57 represented in Fig. 5. In this latter case, the link 60 would merely swing to the right through the larger angle, the hinge pin 54 of the toggle mechanism sliding in the lost-motion slot 62. Thus, the toggle mechanism would be free to collapse, as it is upon subsequent deenergization of the electromagnet 30, 31, in the position shown in Fig. 6. Thus, it is seen that the movement of the crank arm 40 and that of the movable contacts of the circuit interrupter, upon disengagement of the latch member 46 and the bell-crank 43, is completely independent of the position of the armature 57 and its connected operating link 60. In other words, the movable contacts and their connected mechanism are completely trip-free of the operating mechanism.

It will be noted that, in the above-described opening operation of the operating mechanism, the initial opening force is transmitted to rotate the bell-crank 43 about its pivot 50 by virtue of the biasing spring 42 operating through the toggle mechanism 52, 53 and the pin 56. The lever arm of this force operating on the pin 56 about the pin 50 is, necessarily, very small in order to minimize the tripping force required to disengage the latch 46 from the arm 45. If friction is present to a substantial degree, as would be the case if the stop member to limit the upper travel of the hinge of the toggle mechanism 52, 53 were a part of the stationary housing structure, it might sometimes occur that this opening force acting about such a small lever arm might be ineffective to open the breaker against the frictional resistance. By incorporating the stops 52*a*—53*a* in the toggle mechanism itself, however, this frictional resistance is reduced to a minimum and comprises only the rotational resistance at the several pivots. This arrangement thus insures reliable opening of the circuit breaker in response to the tripping of the latch 46.

As the operating mechanism returns to circuit-opening position, and as the electromagnet 30, 31 is deenergized to allow the armature 57 and link 60 to fall, the spring 48 rotates the bell-crank 43 in a counter-clockwise direction so that the detent 45 automatically reengages the latch member 46. This arrangement for engagement of the latch before the initiation of the successive closing operation of the breaker eliminates the possibility of any hammer blow or jar tending to injure the latched surfaces or alter their position during the closing movement, and tends to make the operation of the latching mechanism more reliable. It will be noticed that the latch can be released at any time irrespective of the position of the closing mechanism, so that the breaker is not only trip-free from the initial touching of the contacts, but also for all other positions of the closing mechanism; that is, the latch may be maintained positively disengaged so that it is impossible to touch the contacts even momentarily.

While we have illustrated an electromagnet 30, 31 and cooperating armature 57 for actuating the operating link 60, it will be readily apparent that this link may be actuated manually or by any other suitable electrical or mechanical means.

While we have illustrated our invention as applied to a 3-pole circuit interrupter of the air-break type, it will be obvious to those skilled in the art that it is equally suitable for application to circuit interrupters generally of any of the well-known types and of any number of poles.

While we have described what we at present consider the preferred embodiment of our invention, it will be apparent to those skilled in the art that various changes and modifications may be made without departing from our invention, and we therefore aim in the appended claims to cover all such changes and modifications as fall within the true spirit and scope of our invention.

What we claim is:

1. An electric circuit interrupter comprising a base member, a stationary contact mounted thereon, a pivotally mounted actuating shaft, a movable contact supported therefrom, an operating crank arm engaging said shaft, a bell-crank member, a latch member normally engaging an arm of said bell-crank member to restrain it from motion about its pivot, a toggle mechanism interconnecting said crank arm and said bell-crank and provided with an operating pin, an electromagnet provided with a movable armature, an operating link connected to said armature and provided with a lost-motion slot engaging said operating pin, whereby energization of said electromagnet is effective to operate said toggle mechanism to overcenter position and move said contacts into engagement, stop means for limiting the travel of said toggle in overcenter direction, means for tripping said latch member, biasing means effective upon operation of said tripping means to move said bell-crank and its connected toggle mechanism and cause a movement of said movable contact to circuit-opening position, a cam surface disposed in the path of motion of a member of said toggle mechanism during the above-mentioned tripping operation and effective to break said toggle mechanism, and an auxiliary biasing spring interconnecting said bell-crank and said latch member and operatitve, upon the collapse of said toggle mechanism, to return said bell-crank and said latch member to their respective normal positions and to secure a reengagement therebetween.

2. An electric circuit interrupter comprising a base member, a plurality of stationary contacts mounted thereon, a pivotally mounted actuating shaft, a plurality of movable contacts supported therefrom and disposed, upon angular movement thereof, to engage corresponding stationary contacts, an operating crank engaging said shaft, a bell-crank member, a latch member normally engaging an arm of said bell-crank member to restrain it from motion about its pivot, a toggle mechanism interconnecting said crank arm and said bell-crank and provided with an operating pin, an electromagnet provided with a movable armature, an operating link connected to said armature and provided with a lost-motion slot engaging said operating pin, whereby energization of said electromagnet is effective to operate said toggle mechanism to overcenter position and move said contacts into engagement, stop means for limiting the travel of said toggle in overcenter direction, separate means responsive to abnormal conditions in the circuit associated with each pair of cooperating contacts, a trip shaft responsive to the operation of any of said last-named means and upon which is mounted said latch member, biasing means effective, upon operation of said tripping means, to move said bell-crank and its connected toggle mechanism and cause a separation of said stationary and movable contacts, a cam surface disposed in the path of motion of a member of said toggle mechanism during the above-mentioned tripping operation and effective to break said toggle mechanism and an auxiliary biasing spring interconnecting said bell-crank and said latch member and operative upon the collapse of said toggle mechanism, to return said bell-crank and said latch member to their respective normal positions and to effect their reengagement.

3. In an electric circuit interrupter comprising movable and stationary contacts, operating mechanism for said movable contact comprising an electromagnet provided with a movable armature, an actuating member for connection to said movable contact, a latching mechanism normally restrained from motion, a linkage mechanism interconnecting said actuating member and said latching mechanism and provided with an operating pin, an operating link connected to said armature and provided with a lost-motion slot engaging said operating pin, whereby energization of said electromagnet is effective to operate said movable contact to circuit-closing position, means for tripping said latching mechanism, and biasing means effective to move said latching mechanism and its connected members and cause a movement of said movable contact to circuit-opening position upon the operation of said tripping means.

4. In an electric circuit interrupter comprising movable and stationary contacts, operating mechanism for said movable contact comprising an electromagnet provided with a movable armature, an actuating member for connection to said movable contact, a pivotally mounted auxiliary member, force multiplying mechanism interconnecting said actuating member and said pivotally mounted member and provided with an operating pin, an operating link pivotally connected to said armature and provided with a lost-motion slot engaging said operating pin, a latch member normally engaging said auxiliary member and restraining it from rotation about its pivot, whereby energization of said electromagnet is effective to operate said movable contact to circuit-closing position through said force multiplying mechanism, means for disengaging said latch member and said auxiliary member, and biasing means effective to rotate said auxiliary member about its pivot and cause a movement of said movable contact and said interconnecting mechanism to circuit opening position upon operation of said disengaging means.

5. In an electric circuit interrupter comprising movable and stationary contacts, operating mechanism for said movable contact comprising an actuating member for connection to said movable contact, a bell-crank member, a latch member normally engaging an arm of said bell-crank member to restrain it from motion about its pivot, a toggle mechanism interconnecting said actuating member and the other arm of said bell-crank member, means for extending said toggle mechanism and operating it to an overcenter position to operate said movable contact to circuit-closing position, means for disengaging said latch member and said bell-crank member, and biasing means effective, upon operation of said disengaging means, to rotate said bell-crank about its pivot and cause a movement of said movable contact to circuit-opening position.

6. In an electric circuit interrupter comprising movable and stationary contacts, operating mechanism for said movable contact comprising an actuating member for connection to said movable contact, a latching mechanism normally restrained from motion, a toggle mechanism interconnecting said actuating member and said latching mechanism, means for extending said toggle mechanism and operating it to an overcenter position to operate said movable contact to circuit-closing position, means for tripping said latch mechanism, biasing means effective, upon operation of said tripping means, to move said latching mechanism and its connected toggle mechanism and cause a movement of said movable contact to circuit-opening position, and a cam surface disposed in the path of motion of a member of said toggle mechanism during the above-mentioned tripping operation and effective to break said toggle mechanism.

7. In an electric circuit interrupter comprising movable and stationary contacts, operating mechanism for said movable contact comprising an actuating member for connection to said movable contact, a latching mechanism normally restrained from motion, a toggle mechanism interconnecting said actuating member and said latching mechanism, means for extending said toggle mechanism and operating it to an overcenter position to operate said movable contact to circuit-closing position, means for limiting the movement of said toggle mechanism in an overcenter direction, whereby said movable contact is latched in circuit-closing position, means for tripping said latch mechanism, a spring connected to bias said movable contact and effective, upon operation of said tripping means, to move said latching mechanism and its connected toggle mechanism and cause a movement of said movable contact to circuit-opening position, and a cam surface disposed in the path of motion of the intermediate pivot of said toggle mechanism during the above-mentioned tripping operation and effective to break said toggle mechanism from its overcenter position.

8. In an electric circuit interrupter comprising movable and stationary contacts, operating mechanism for said movable contact comprising an actuating member for connection to said movable contact, a bell-crank member, a latch member normally engaging an arm of said bell-crank member to restrain it from motion about its pivot, a toggle mechanism interconnecting said actuating member and the other arm of said bell-crank member, means for extending said toggle mechanism and operating it to an overcenter position to operate said movable contact to circuit-closing position, means independent of said operating mechanism and of any stationary parts of said interrupter for limiting the motion of said toggle mechanism in an overcenter direction, means for disengaging said latch member and said bell-crank member, and biasing means effective, upon operation of said disengaging means, to rotate said bell-crank about its pivot and cause a movement of said movable contact to circuit-opening position.

9. In an electric circuit interrupter comprising movable and stationary contacts, operating mechanism for said movable contact comprising an actuating member for connection to said movable contact, a bell-crank member, a latch member normally engaging an arm of said bell-crank member to restrain it from motion about its pivot, a toggle mechanism interconnecting said actuating member and the other arm of said bell-crank member, means for extending said toggle mechanism and operating it to an overcenter position to operate said movable contact to circuit-closing position, cooperating stop members carried by the links of said toggle mechanism for limiting the motion of said toggle mechanism in an overcenter direction, means for disengaging said latch member and said bell-crank member, and biasing means effective, upon operation of said disengaging means, to rotate said bell-crank about its pivot and cause a movement of said movable contact to circuit-opening position.

10. In an electric circuit interrupter comprising movable and stationary contacts, operating mechanism for said movable contact comprising an actuating member for connection to said movable contact, a bell-crank member, a latch member normally engaging an arm of said bell-crank member to restrain it from motion about its pivot, a toggle mechanism interconnecting said actuating member and the other arm of said bell-crank member, means for extending said toggle mechanism and operating it to a slightly overcenter position to operate said movable contact to circuit closing position, means independent of said operating mechanism and of any stationary parts of said interrupter for limiting the travel of said toggle mechanism in an overcenter direction, said extending means imparting a momentum to said toggle mechanism aiding in its travel from said overcenter position to a position determined by said limiting means, means for disengaging said latch member and said bell-crank member, and biasing means effective, upon operation of said disengaging means, to rotate said bell-crank about its pivot and cause a movement of said movable contact to circuit-opening position.

11. In an electric circuit interrupter, comprising movable and stationary contacts, operating mechanism for said movable contact comprising an actuating member for connection to said movable contact, a bell-crank member, a latch member normally engaging an arm of said bell-crank member to restrain it from rotation about its pivot, a toggle mechanism interconnecting said actuating member and the other arm of said bell-crank member, means for extending said toggle mechanism and operating it to an overcenter position to operate said movable contact to circuit-closing position, means for disengaging said latch member and said bell-crank, a biasing spring effective, upon operation of said disengaging means to rotate said bell-crank about its pivot and cause a movement of said movable contact to circuit-opening position, and an auxiliary biasing spring interconnecting said bell-crank and said latch member and operative, upon the collapse of said toggle mechanism, to return said bell-crank to its normal position after a circuit-opening operation, and to effect the reengagement between said latch member and said bell-crank.

12. In an electric circuit interrupter comprising movable and stationary contacts, operating mechanism for said movable contact comprising an actuating member for connection to said movable contact, a latching mechanism normally restrained from motion, a toggle mechanism interconnecting said actuating member and said latching mechanism, means for extending said toggle mechanism and operating it to an overcenter position to operate said movable contact to circuit-closing position, means for tripping said latch mechanism, biasing means effective, upon operation of said tripping means, to move said latching mechanism and its connected toggle mechanism and cause a movement of said movable contact to circuit-opening position, and means disposed in the path of motion of a member of said toggle mechanism during the above-mentioned tripping operation and effective positively to break said toggle mechanism.

13. In an electric circuit interrupter comprising movable and stationary contacts, operating mechanism for said movable contact comprising an actuating member for connection to said movable contact, a three-element toggle mechanism connected to operate said actuating member and normally having both hinges on the same side of center, one end link of said toggle mechanism comprising a latch element, a latch member normally engaging said latch element to restrain it from motion about its pivot, means for disengaging said latch member and said latch element, and biasing means effective, upon operation of said disengaging means, to rotate said end link about its pivot and cause a translatory movement of the other toggle links to move said movable contact to circuit-opening position.

HERBERT C. GRAVES, JR.
OTTO JENSEN.